May 27, 1947.　　　J. R. MILLER　　　2,421,077
PROJECTOR APPARATUS
Filed Dec. 8, 1944　　　2 Sheets-Sheet 2

JOSEPH R. MILLER
INVENTOR.
BY
ATTORNEY

Patented May 27, 1947

2,421,077

UNITED STATES PATENT OFFICE 2,421,077

PROJECTOR APPARATUS

Joseph R. Miller, Forest Hills, N. Y., assignor to Bendix Aviation Corporation, Brooklyn, N. Y., a corporation of Delaware Application December 8, 1944, Serial No. 567,179

3 Claims. (Cl. 88—24)

1

The present invention relates to projector apparatus and deals more particularly with projectors of the type which are associated with plotting tables aboard ship, although it is not limited to such use.

While projectors of this general character have been heretofore proposed, they have not proved altogether successful, especially where the ship's course and the target bearing are to be projected simultaneously because the inertia of the parts is so great as to cause the angular position of the projected image to lag behind the true ship or target bearing. Some of them have been of complicated construction, requiring supporting the lamp directly upon a rotating part of the device, which leads to electrical and optical complications.

It is accordingly the primary object of this invention to provide a novel projector embodying a freely rotatable reticle carrying device, which is mounted for substantially frictionless rotation and is of minimum mass, whereby it may rapidly and accurately respond to changes in the ship or target bearing or other condition which it is desired to convert into a projected image, and which is of compact, efficient, and rugged design, to withstand shock and vibration on shipboard.

Another important object is to provide a novel projector embodying a plurality of independently coaxially rotatable members bearing the data which it is desired to project upon the screen, in combination with means for journalling and driving them located solely at their peripheries, whereby rays from a stationarily located projection lamp may be projected directly therethrough in accurate manner.

A further object is to provide a novel projector of compact form, embodying a pair of self-synchronous motors independently driving a pair of rim-journalled transparent members bearing the data which it is desired to project, the latter being supported in closely adjacent coaxial relationship, whereby the data may be projected as superimposed images in substantially exact focus on the screen.

The invention aims to also provide further improvements and refinements in the projector art, which will become apparent as the specification proceeds in conjunction with the annexed drawings, and from the appended claims.

In the drawings—

Fig. 4 is an elevational view of one of the transparent data bearing members, and Fig. 5 is a similar view of the other transparent member.

Figure 1:
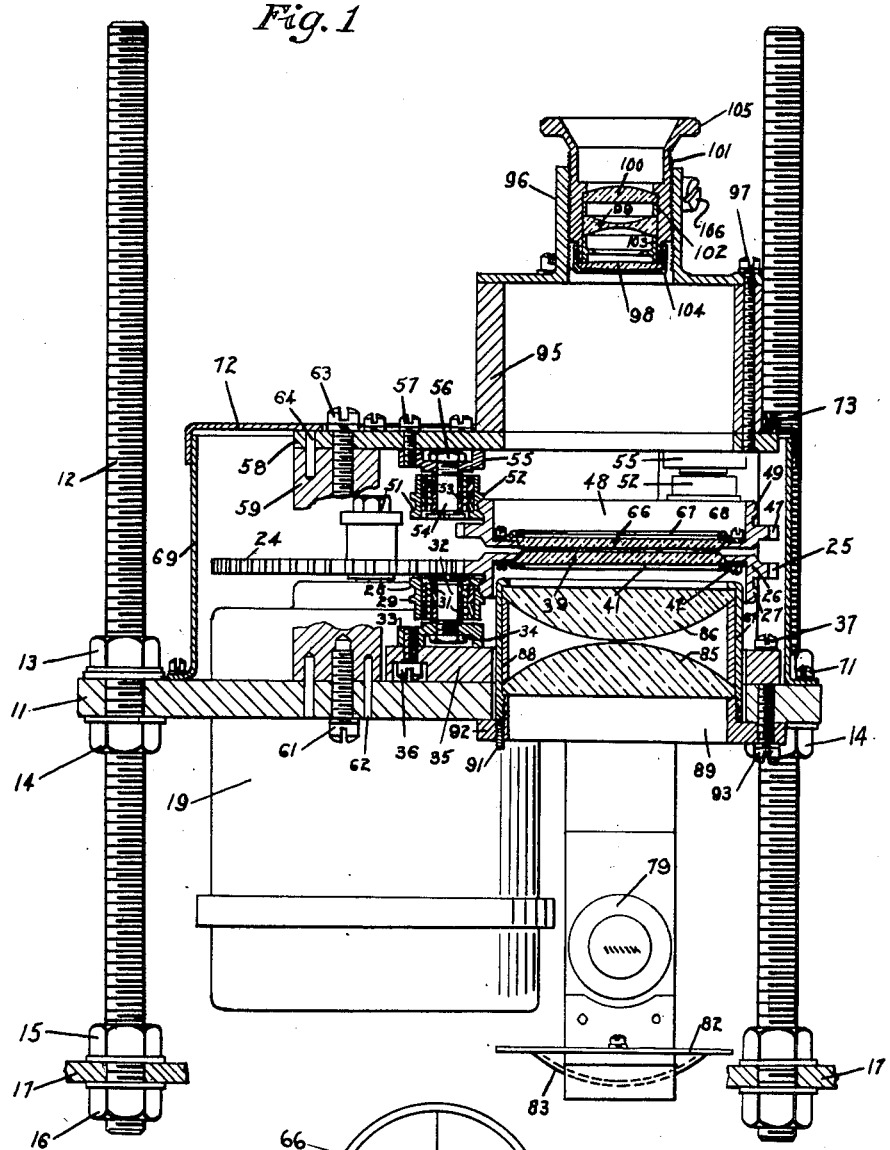
Fig. 1 is a vertical sectional view through a projector embodying the invention.

With continued reference to the drawings, in which like reference characters have been employed to designate similar parts throughout the several views—the various parts of the projector are supported upon a foundation or base plate 11 which is supported by means of a plurality of threaded rods 12. Plate 11 is clamped between nuts 13 and 14, threaded on the rods. Pairs of nuts 15 and 16, located at the lower ends of the rods are utilized to adjustably clamp the latter to bracket or other supporting members 17, which may in turn be suitably mounted on any desired supporting structure. By adjusting the various pairs of nuts, it is apparent that the rods may be vertically adjusted and that the base plate may be adjusted toward and away from the supporting brackets, to place the projector in the desired position.

The invention has been illustrated as applied to a projector for navigational and fire control purposes, in which the output signals from a sighting device or range finder and a ship's compass are fed to two self-synchronous motors, which are geared to relatively rotatable collars or frames carrying transparent discs inscribed with the data or information which it is desired to project upon the screen, which in this instance comprises an arrow designating the ship's course, and a further arrow designating the bearing of the target with respect to the ship's course, the two collars being rotatable about a common axis, whereby the two images will be projected in superimposed relationship upon the screen. While the invention has been disclosed as incorporated in a ship's course projector, it is to be understood that it is not limited to such use, and may be applied to any device in which it is desired to project superimposed images upon a screen.

Figure 2:
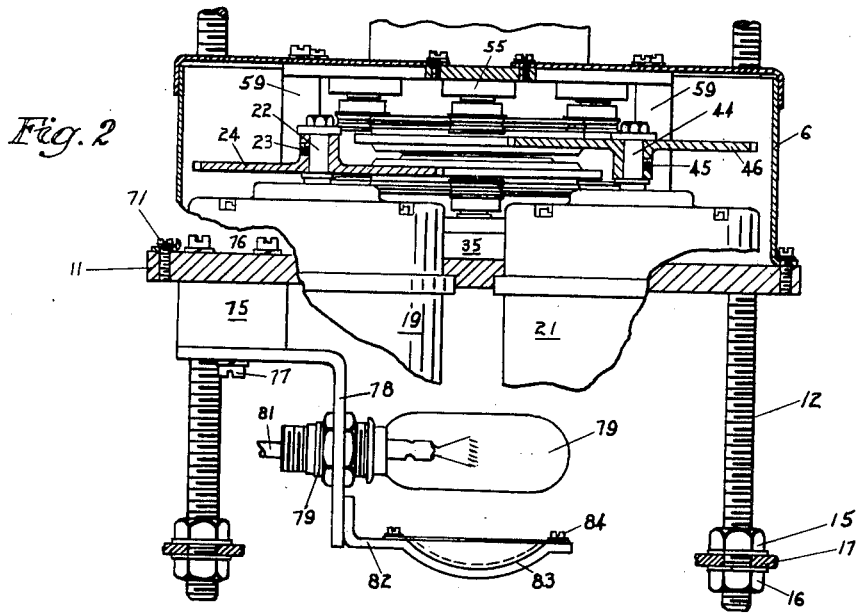
Fig. 2 is an elevational view, with parts broken away, of the projector of Fig. 1, as it appears when viewed from the left-hand side of that figure.

Referring to Fig. 2, a pair of self-synchronous motors 19 and 21 project through openings in base 11, and their primaries and secondaries are energized by alternating current to effect the desired rotation, in well-known manner. Rigidly secured to shaft 22 of motor 19, by means of a set screw 23, is a spur gear 24 which meshes with a spur gear 25 provided on a collar or mounting ring assembly 26. In the embodiment of the invention illustrated, gears 24 and 25 are of identical pitch circle diameter, so that rotation of collar 26 will accurately follow the rotation of motor 19, in reverse direction.

I have found that by making collar 26 of minimum mass, and supporting it for rotation solely at its periphery, it is possible to achieve a mechanism having very low rotational inertia, and one which will quickly respond to changes in the speed and direction of rotation of self-synchronous motor 19.

To this end, collar 26 is provided with an axially extending portion 27, having oppositely beveled faces or raceways which cooperate in rolling engagement with correspondingly shaped grooves 28 of rollers 29. Preferably three rollers, spaced 120° apart are employed to support the collar. They are preferably journalled upon pairs of anti-friction bearings 31, carried by screws 32. Each screw is threaded into a cup member 33 and is locked in place by a nut 34. Retainers 33 are rigidly secured in place on a sub base 35 by means of a plurality of screws 36. Sub base 35 may be held in place on the base in any suitable manner, as for instance by a plurality of screws 37. Mounted in a beveled opening in collar 27 is a glass or other transparent plate 39, having correspondingly beveled edges. The latter is held in place by means of a reticle 41 and screws 42. As seen in Fig. 4, member 39 is provided on its upper face with a pointer-like indicia 40, which may be etched and painted or formed in any other suitable manner.

Secured to shaft 44 of motor 21, by means of a set screw 45, is a spur gear 46 which meshes with an integrally formed gear 47 on a collar 48, which as seen in Fig. 1 is concentrically disposed with respect to collar 26. Collar 48 is provided with an axially extending hub 49 having beveled surfaces which cooperate with the correspondingly shaped grooves 51 of three rollers 52, which are spaced in similar relationship to the rollers associated with collar 26. Rollers 52 are journalled on pairs of anti-friction bearings 53 carried by screws 54. In this instance retainer members 55, to which screws 54 are locked by nuts 56, are secured by screws 57 to generally triangular plate 58. The latter is supported in rigidly spaced relationship to the base by means of three legs 59 which are of identical construction, one leg being located at the front, and two legs being located at the rear of the device. Each leg is secured to the base by a screw 61 and a pair of dowels 62. Plate 58 is secured to the tops of the three legs by means of screws 63 and dowels 64.

Collar 48 is provided with a beveled opening concentrically located with respect to the opening in collar 26, and a glass plate 66 is secured therein by means of a reticle 67 and screws 68. As seen in Fig. 5, plate 66 is provided with a line 70, which functions as a pointer and may be formed in the plate by etching and painting or the like.

Figure 3:
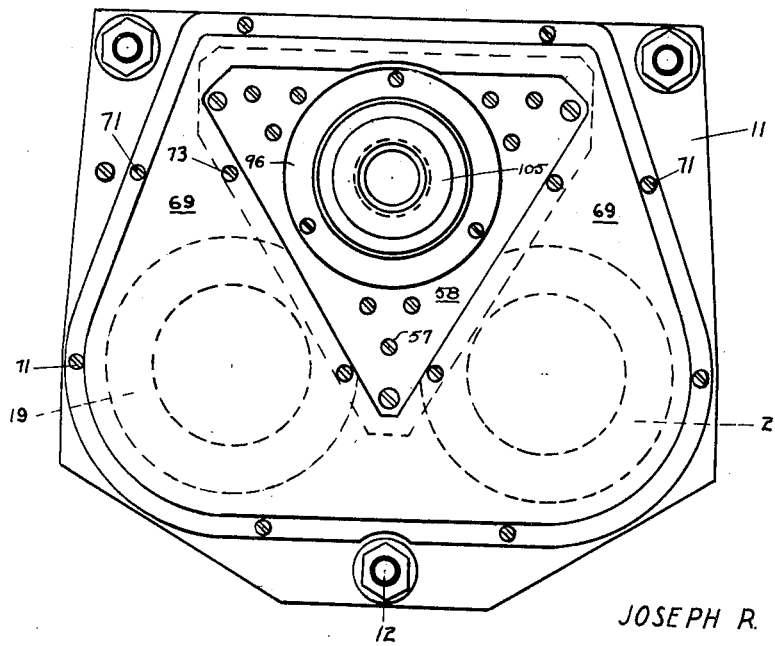
Fig. 3 is a top plan view of the structure shown in Figs. 1 and 2.

The structure is preferably enclosed by sheet metal housing 69, which as seen in Fig. 3 is of generally rectangular shape and has a flanged lower edge secured to base 11 by means of a plurality of screws 71. A flanged cover 72 fits over housing 69 and may be secured in place in any suitable manner, as by means of a plurality of screws 73 threaded into plate 58, as seen in Figs. 1 and 3.

The light projecting assembly device will now be described.

Referring to Figs. 1 and 2, a block 75 is secured to the underside of base 11 by means of screws 76, and secured to the lower face thereof as by means of screws 77, is a bracket 78 to which a light receptacle assembly 79 is secured in conventional manner. A bulb 79, of any suitable character, is mounted in the light socket and current is fed thereto by means of an electrical conduit 81, in well-known manner. Secured to bracket 78 is a light reflector assembly comprising a plate 82 and a reflector 83, the parts being secured together by screws 84. The light from bulb 79 passes through lower and upper condenser lenses 85 and 86 respectively, and thence through plates 39 and 66.

The condenser lenses are preferably installed in the structure as a pre-assembled unit. To this end they are mounted in a cylindrical member 87 having a flanged upper end. A spacer 88, located between the lenses, maintains them in proper axially spaced relationship, and a ring 89 threaded into sleeve 87 maintains the entire assembly in place. Ring 89 and sleeve 87 may be locked by means of a set screw 91. Ring 89 is provided with a flange 92 which is secured to the lower face of the base 11 by means of a plurality of screws 93. From the forgoing it is apparent that by removing screws 93 the entire condenser assembly may be lowered through the openings in the base and sub-base and dropped away from and removed from the device.

The upper lens assembly is supported upon a spacer sleeve 95, and a flanged plate 96, the two parts being secured to each other and to plate 58 by means of a plurality of long screws 97. The upper lens assembly comprises a plurality of lenses 98, 99, and 100, and are maintained in proper spaced relationship within a thimble 101 by means of spacers 102 and 103, and a flanged sleeve 104, which is threaded onto the lower end of the thimble. The upper end of the thimble is provided with a knurled flange 105 by which it may be threaded into or out of collar 96 to effect proper focusing of the image on the screen. Collar 96 is longitudinally split at one side, and a set screw 106 is provided for drawing the two halves of the collar together for locking the thimble in adjusted position, in a manner well understood in the art.

During assembly of the mechanism rollers 29 and 52 are adjusted properly with respect to the axis of rotation of discs 39 and 66 to secure proper frictionless rotation. In other words, they are adjusted so that the beveled tracks on the collars snugly fit into the grooves in the rollers with sufficient clearance for free rolling coaction therewith and yet they fit sufficiently tight so that the collars are restrained against any substantial amount of axial displacement. The foregoing adjustment may be made in any suitable manner, as for instance by forming the openings in plates 35 and 58 through which screws 36 and 57 respectively project, slightly oversize, so that the screws may be loosened and the roller assemblies bodily moved toward or away from the axis of rotation. When the adjustment is completed, the screws are tightened to permanently lock the parts in place.

It should be particularly observed that by reason of the novel collar and roller assembly, in which the rollers of the respective collar assemblies are disposed on opposite sides of a plane passing between discs 39 and 66, the discs may be placed in extremely close proximity and by providing the pointer representations 40 and 70 on the neighboring faces of the discs, a construction is achieved in which both of the pointer representations are projected in exact focus and appear as superimposed images on the screen.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a projector, a base structure, a pair of gears rotatably supported by said base structure in substantially side-by-side relationship, with their axes substantially parallel; a pair of ringlike members disposed adjacent said gears; means mounting said members for independent rotation about a common axis located parallel to the axes of said gears and spaced substantially equal distances from the axes of said gears, whereby lines drawn between the several axes define a substantially equilateral triangle; means for transmitting power from one of said gears to one of said members comprising gear means on said one member meshing with said one gear; means for transmitting power from the other of said gears to the other of said members comprising gear means on said other member meshing with said other gear, said one gear and its gear means being axially offset from said other gear and its gear means; an indicia-carrying transparent element mounted in each of said ring-like members; and stationarily supported means for projecting a beam of light through said elements; and lens means for causing said indicia to be projected as clearly defined images upon a screen or the like.

2. In a projector apparatus, a foundation plate; a projector lamp supported to one side of said foundation plate; a projector lens assembly supported on the other side of said foundation plate; and a unitary condenser lens assembly supported in an opening in said foundation plate, said condenser assembly comprising a flanged sleeve and a flanged collar threadedly connected to each other and clamping a pair of condenser lenses and a spacer between them; means for securing the flange of one of said collars to said foundation plate; and means for supporting a pair of transparent discs for independent rotation in the path of light passing from said condenser assembly to said projector lens assembly, said last named means being supported jointly by said foundation plate and an auxiliary plate mounted on said other side of said foundation plate in spaced relationship thereto.

3. The projector construction defined in claim 1, wherein said means mounting said ringlike members for rotation comprises a plurality of circumferentially spaced rollers cooperating in rolling engagement with the peripheries of said members, the rollers and gear means associated with the respective members being located on opposite sides of a plane disposed between said transparent elements, and said rollers being so disposed as to locate said elements in close proximity, the indicia of said elements being located on the neighboring faces thereof, whereby they may be simultaneously projected upon a screen in exact focus.

JOSEPH R. MILLER.

REFERENCES CITED

The following references are of record in the file of this patent:

UNITED STATES PATENTS

| Number | Name | Date |
|---|---|---|
| 1,579,880 | Meissner et al. | Apr. 6, 1926 |
| 1,703,945 | Meissner | Mar. 5, 1929 |
| 993,296 | Guerrant et al. | May 23, 1911 |
| 2,279,463 | Hopkins | Apr. 14, 1942 |
| 1,137,512 | Miller | Apr. 27, 1915 |
| 2,190,569 | Maggill | Feb. 13, 1940 |
| 1,160,184 | Mackensen | Nov. 16, 1915 |